Oct. 27, 1964     H. H. WIESE     3,154,280

COUNTERBALANCED STRUCTURE

Filed Aug. 13, 1962

INVENTOR.
H. H. WIESE

BY
ATTORNEY

United States Patent Office 3,154,280
Patented Oct. 27, 1964

3,154,280
COUNTERBALANCED STRUCTURE
Harold H. Wiese, Davenport, Iowa, assignor to Mast Development Co., Davenport, Iowa
Filed Aug. 13, 1962, Ser. No. 216,520
7 Claims. (Cl. 248—162)

This invention relates to a counterbalanced structure especially adapted for use in camera tripods and the like.

In structures of this character, it is of prime importance that counterbalanced telescopic movement be accomplished by means efficiently constructed and designed to operate in a minimum of space. Particularly, the counterbalance mechanism must be totally or substantially totally concealed so as not to interfere with normal use of the tripod and so as not to detract from the appearance thereof. Although many forms of counterbalanced telescopic structures have heretofore been provided, none of these attain the ends of simplicity and economy that are afforded by the present invention, the principal object of which is to provide an improved telescopic counterbalanced assembly incorporating concealed mechanism.

It is a significant object of the present invention to use spring means of the spirally wound tape-like type which obtains its constant force characteristic by the straightening of a normally coiled strip. As each increment of coil is straightened, a similar increment of coil is presented for straightening. Springs of this type are known to the art, having been previously patented in such U.S. patents as 2,609,191 and 2,609,192. The feature of utilizing springs of this type in the present invention is that they are relatively small is comparison to the functions they perform, thus lending themselves to accommodation within telescopic tubular members. A further feature of the invention resides in novel means for supporting these springs, together with provision for enabling the support and springs to rotate relative to a fixed structure without twisting the free ends or bands of the springs. It is a further object of the invention to utilize springs of this type in pairs so that the forces are equally distributed at diametrically opposite sides of the elongated telescopic structure.

The foregoing and other important objects and desirable features inherent in and encompassed by the invention will become apparent as a preferred embodiment thereof is disclosed in detail in the ensuing description and accompanying sheet of drawings, the figures of which are described below.

Figure 1:
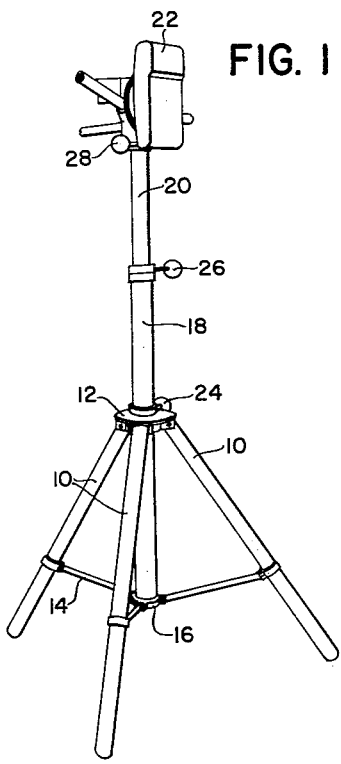
FIGURE 1 is a representative camera tripod utilizing the counterbalanced structure.

In the tripod structure chosen for purposes of illustration, the lower part thereof comprises three legs 10 pivotally connected to an upper bracket 12 and having links 14 pivotally connected to what may be regarded as a base or support member 16. Rigidly secured to the base 16 and rising coaxially therefrom is a cylindrical outer or fixed tube 18, and telescopically carried by the fixed tube 18 is a cylindrical movable or upper tube 20, to the top end of which may be mounted any suitable means for carrying a camera, such as indicated at 22. Suitable clamps for effecting adjustment of the tripod are shown respectively at 24, 26 and 28. The clamp 26, although omitted from the remaining figures, will be recognized as utilized for the purpose of tightening the tube 18 on the tube 20 so as to secure the vertical position of the latter.

Figure 2:
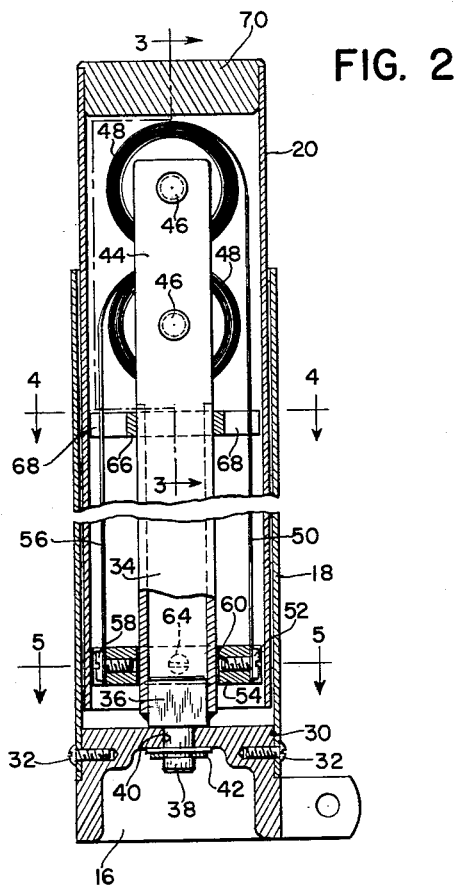
FIGURE 2 is an enlarged sectional view, with portions omitted, illustrating the interior structure of the counterbalanced mechanism.
Figure 3:
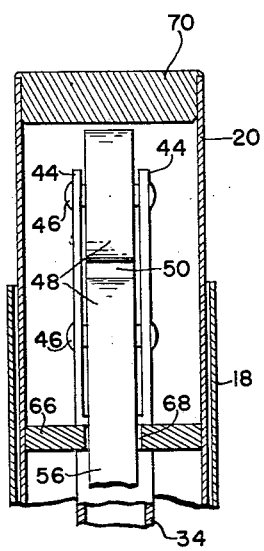
FIGURE 3 is a fragmentary section, partly in elevation, as viewed generally along the line 3—3 of FIGURE 2.

As best shown in FIGURE 2, the base 16 may be a casting having an upper circular marginal rim 30 in the form of an annular rabbet which concentrically interfits with the lower end of the fixed tube 18. Affixation of the tube 18 to the marginal portion 30 may be accomplished by a plurality of screws as shown at 32. Thus, the tube 18 becomes in effect an integral part of the base 16; although, separability is desired for purposes of assembly, disassembly, etc.

The tubes 18 and 20 are of relatively large diameter when compared with the cross section of a central column or support 34, and thus the interior surface of the tube 20 spatially surrounds the column. The column rises coaxially from the base 16 and is here of square tubular cross-section. The lower end of the column is closed by a plug 36 which may be welded or otherwise secured to the column. The plug has a reduced cylindrical end 38 which is rotatably received in a vertical bore 40 in the base, whereby the column is carried for angular movement relative to the base. Any form of securing means may be utilized, such as the washer and snap ring means indicated at 42.

The column 34 rises to an upper bifurcated end afforded by a pair of straps 44 between which are carried upper and lower parallel shafts 46. The upper end of the column is therefore adapted to carry spring means, and, specifically, the shafts 46 respectively carry upper and lower oppositely spirally wound tape-like springs 48. Each of these springs is of the type forming the subject matter of the above-noted patents, the characteristics of which springs are described briefly above and are otherwise well known. In the present case in particular, the limited space available makes these springs desirable since relatively small springs are capable of exerting sufficient force to counterbalance the weight of the movable tube and camera thereon. In other words, the spring means can be perfectly matched to the load so that the only force required to move the load is that necessary to overcome friction that may be present in the mechanism. Since these frictional forces are generally dependent on relative motion only, the force required to move the load from an initial position or to return the load to the initial position will be equal, in which case frction acts as a stabilizing and damping factor. Other spring combinations could of course be selected; that is, greater or less than the contemplated load.

Figures 4, 5:
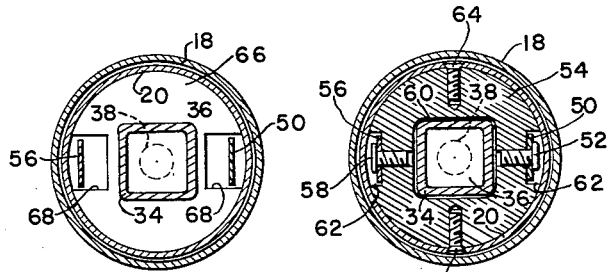
FIGURE 4 is a section as seen along the line 4—4 of FIGURE 2.
FIGURE 5 is a section as seen along the line 5—5 of FIGURE 2.

Because of the nature of these springs and the opposite winding thereof, the free end portions thereof can be made to extend respectively at diametrically opposed sides of the column 34 within the confines of the diameter of the movable tube 20 or in diametrically opposite portions of the annular space provided between the column 34 and the interior of the tube 20. Thus, the free end portion of the upper spring 48, indicated at 50 extends downwardly to the right-hand side of the column as seen in FIGURE 2 and has its lower end anchored at 52 to one side of a collar 54 that is affixed to the lower end of the movable tube 20 and which slidably but non-rotatably engages the column. The free end portion of the other spring, as at 56, is similarly anchored at 58 to the diametrically opposite portion of the collar 54. As previously noted, the tube 34 is of square cross-section. The collar is provided with a correspondingly square opening 60 (FIGURE 5) for accomplishing the keying of the two parts together whereby the movable tube may move vertically relative to the column but is constrained for angular movement with the column about the axis of the pivot at 38. FIGURE 5 shows also that the collar is cut out at diametrically opposite sides at 62 to receive the anchored portions of the springs. This keeps the heads of the cap screws 52 and 58 out of engagement with the internal wall of the tube 20. The tube 20 is affixed to the collar by means of a pair of diametrically opposed screws 64, preferably arranged on a diameter that is 90° to the diameter on which the screws 52 and 56 lie. This affords a simple method of assembly so that the parts can be telescopically associated.

In addition to the telescopic interfit between the tubes 18 and 20, a guiding action is accomplished by the relationship between the column 34 and the square opening 60 in the collar. A further guiding relationship may be established just below the upper end of the column by means of a guide 66 which is rigidly affixed to the column in any suitable manner. This guide is best shown in FIGURE 4 as to its shape, wherein it will be seen that it is notched or formed with openings 68 at diametrically opposite sides thereof. One of these notches receives the free end 50 of one spring 48 and the other notch receives the free end 56 of the other spring. The unnotched peripheral portions of the guide may be slidably associated with the interior wall of the tube 20 and this in conjunction with the general relationship between the parts provides an accurate stabilized motion.

Since the springs are secured to the collar at their lower ends (52 and 58) and since the collar is secured to the tube 20 and is keyed to the column 34, the column, springs and tube 20 may turn about the vertical axis of the pivot 38 without in any way twisting the spring portions 50 and 56.

Since the collar 54 is below the guide 66, it will be seen that when the tube 20 is fully extended relative to the fixed tube 18, the collar can engage the guide and therefore effect a stop to prevent complete separation of the two tubes. The tube 20 may be closed at its upper end by a plug at 70 to complete the structure and to afford a stable mount for the camera 22.

It will be seen from the foregoing that the mechanism is simply constructed and is wholly contained within the telescopic structure. The use of the springs of the type noted provides a noiseless mechanism without requiring the use of silencing sleeves etc. The parts are adequately proportioned to accommodate themselves within a telescopic structure of the size required.

Features and advantages other than those enumerated will readily occur to those versed in the art, as will many modifications and alterations in the preferred embodiment of the invention, all without departure from the spirit and scope of the invention.

What is claimed is:

1. A counterbalanced structure, comprising: a base; a column secured at its lower end to and rising from the base to an upper end; a fixed cylindrical tube of materially larger cross-section than the column and disposed concentrically therewith, said tube having a lower end affixed to the base and having an open upper end; a movable cylindrical tube extending coaxially downwardly through said open end and telescopically received in said fixed tube, said movable tube likewise being of materially greater cross-section than the column so as to afford a substantial annular space thereabout; a collar fixed to the lower end of the movable tube and surrounding and vertically slidably engaging the column and having diametrically opposite notches; a guide fixed to the column short of its upper end and above the collar and slidably engaging the interior of the movable tube, said guide having diametrically opposed openings therein; and a pair of oppositely wound coil springs carried on vertically alined axes at the upper end of the column above the guide and within the confines of the movable tube and respectively having free end portions extending downwardly at opposite sides of the column and through said openings and anchored respectively to said diametrically opposite notches of the collar.

2. The invention defined in claim 1, in which: the base has an upper circular marginal rim coaxially interfitting with the lower end of the fixed tube.

3. The invention defined in claim 1, in which: the lower end of the column has pivot means coaxially connecting the column to the base for angular movement of the column relative to the base; and the column and movable tube have cooperative means enabling relative vertical movement of the two but constraining the movable tube for angular movement with the column.

4. The invention defined in claim 1, in which: the lower end of the column has pivot means coaxially connecting the column to the base for angular movement of the column relative to the base; the column is of non-circular section; and the collar has a correspondingly non-circular opening therethrough slidably but non-rotatably fitting the column whereby the movable tube and column are constrained for angular movement together.

5. A counterbalanced structure, comprising: a base; a column secured at its lower end to and rising from the base to an upper end; a fixed cylindrical tube of materially larger cross-section than the column and disposed concentrically therewith, said tube having a lower end affixed to the base and having an open upper end; a movable cylindrical tube extending coaxially downwardly through said open end and telescopically received in said fixed tube, said movable tube likewise being of materially greater cross-section than the column so as to afford a substantial annular space thereabout; a collar fixed to the lower end of the movable tube and vertically slidably engaging the column; and a pair of oppositely wound coil springs carried at the upper end of the column and within the confines of the movable tube and respectively having free end portions extending downwardly at opposite sides of the column and anchored to diametrically opposite sides of the collar.

6. A counterbalanced structure, comprising: a base; a column secured at its lower end to and rising from the base to an upper end; a fixed cylindrical tube of materially larger cross-section than the column and disposed concentrically therewith, said tube having a lower end affixed to the base and having an open upper end; a movable cylindrical tube extending coaxially downwardly through said open end and telescopically received in said fixed tube, said movable tube likewise being of materially greater cross-section than the column so as to afford a substantial annular space thereabout; and a pair of oppositely wound coil springs carried at the upper end of the column and within the confines of the movable tube and respectively having free end portions extending downwardly at opposite sides of the column and anchored to diametrically opposite portions of the movable tube adjacent to the lower end thereof.

7. The invention defined in claim 6, in which: the lower end of the column has pivot means coaxially connecting the column to the base for angular movement of the column relative to the base; and the column and movable tube have cooperative means enabling relative vertical movement of the two but constraining the movable tube for angular movement with the column.

References Cited in the file of this patent

UNITED STATES PATENTS

| 2,635,282 | Trammell et al. | Apr. 21, 1953 |
| 2,961,260 | Newlin | Nov. 22, 1960 |

FOREIGN PATENTS

| 51,392 | Germany | July 12, 1889 |
| 334,312 | Great Britain | Sept. 4, 1930 |
| 1,132,309 | France | Oct. 29, 1956 |